US012755649B2

(12) United States Patent
Park

(10) Patent No.: US 12,755,649 B2
(45) Date of Patent: Oct. 6, 2026

(54) SIMULATED HUMAN BODY MODEL FOR INJECTION TRAINING

(71) Applicant: EBM CORPORATION, Tokyo (JP)

(72) Inventor: Young-Kwang Park, Tokyo (JP)

(73) Assignee: EBM CORPORATION, Tokyo (JP)

( * ) Notice: Subject to any disclaimer, the term of this patent is extended or adjusted under 35 U.S.C. 154(b) by 338 days.

(21) Appl. No.: 18/568,434

(22) PCT Filed: Jun. 8, 2022

(86) PCT No.: PCT/JP2022/023028

§ 371 (c)(1),
(2) Date: Dec. 8, 2023

(87) PCT Pub. No.: WO2022/260055

PCT Pub. Date: Dec. 15, 2022

(65) Prior Publication Data

US 2024/0371296 A1 Nov. 7, 2024

(30) Foreign Application Priority Data

Jun. 10, 2021 (JP) ................................ 2021-096981
Jul. 1, 2021 (JP) ................................ 2021-109775

(51) Int. Cl.
*G09B 23/28* (2006.01)

(52) U.S. Cl.
CPC ................................ *G09B 23/285* (2013.01)

(58) Field of Classification Search
CPC ...... G09B 23/26; G09B 23/28; G09B 23/285; G09B 23/30; G09B 9/00
See application file for complete search history.

(56) References Cited

U.S. PATENT DOCUMENTS 6,780,016 B1 * 8/2004 Toly .................... G09B 23/285 434/262
2014/0051049 A1 * 2/2014 Jarc ....................... G09B 23/30 434/267

FOREIGN PATENT DOCUMENTS

| | | | |
|---|---|---|---|
| JP | 10-161522 | A | 6/1998 |
| JP | 10-260627 | A | 9/1998 |
| JP | 2005-270509 | A | 10/2005 |
| JP | 3121858 | U | 6/2006 |
| JP | 2013-250453 | | 12/2013 |
| JP | 2014-153482 | A | 8/2014 |
| JP | 2015-69073 | A | 4/2015 |
| JP | 5870349 | B1 | 1/2016 |
| JP | 2019-152770 | A | 9/2019 |

* cited by examiner

*Primary Examiner* — Timothy A Musselman
(74) *Attorney, Agent, or Firm* — Taro Yaguchi

(57) ABSTRACT

To provide a simulated human body model for injection training with a simple structure capable of effecting a reliable evaluation function. There is provided a simulated human body model for injection training, comprising: a first layer 3 for simulating a surface layer of a human body, into which an injection needle makes a puncture externally; a second layer 5, stacked on the first layer 3, and formed so that it disallows penetration therethrough by the injection needle 2' puncturing at any puncture location other than a correct puncture location 4, for causing a trainee to detect an incorrect puncture location; and a third layer 6, stacked on the second layer 5, for simulating subcutaneous tissue receiving the injection needle 2 which penetrated the second layer 5.

13 Claims, 4 Drawing Sheets

SIMULATED HUMAN BODY MODEL FOR INJECTION TRAINING

FIELD OF THE INVENTION

The present invention relates to a simulated human body model used for training of an intramuscular injection or the like.

BACKGROUND OF THE INVENTION

An intramuscular injection needs to be administered at a correct position by making a puncture through the epidermis, dermis, and subcutaneous tissue to reach the muscular layer.

In order to newly secure personnel such as dentists, medical laboratory technicians, and the like for administering vaccination, there is a need to provide a simulated arm model, of a simple structure, having an evaluation function.

SUMMARY OF THE INVENTION

Considering the above situation, the purpose of the present invention is to provide a simulated human body model for injection training, which model being of a simple structure and capable of effecting a reliable evaluation function.

In order to achieve the above object, the following invention is provided.

(1) A simulated human body model for injection training, comprising:

a first layer for simulating a surface layer of a human body, into which an injection needle makes a puncture externally;

a second layer, stacked on the first layer, and formed so that it disallows penetration therethrough by the injection needle puncturing at any puncture location other than a correct puncture location, for causing a trainee to detect an incorrect puncture location; and a third layer, stacked on the second layer, for simulating subcutaneous tissue receiving the injection needle which penetrated the second layer.

(2) The simulated human body model for injection training of the above (1), further comprising a fourth layer, stacked on the third layer, for causing the trainee to detect a puncture depth of the injection needle by being formed of a material different from that of the third layer.

(3) The simulated human body model for injection training of the above (1), wherein the third layer contains a material simulating a muscular layer.

(4) The simulated human body model for injection training of the above (3), wherein the third layer comprises a layer located on the second layer side for simulating the subcutaneous tissue, and a layer stacked thereon for simulating the muscular layer.

(5) The simulated human body model for injection training of the above (1), wherein a structure is provided on the first layer as a reference with which the trainee determines the correct puncture location.

(6) The simulated human body model for injection training of the above (1), wherein a through hole is provided in the second layer for allowing penetration therethrough by the injection needle at the correct puncture location.

(7) The simulated human body model for injection training of the above (6), wherein the through hole comprises an elliptical cross-section having a major axis in a muscular direction.

(8) The simulated human body model for injection training of the above (6), wherein the through hole has a major axis length of 15-30 mm and a minor axis length of 5-20 mm.

(9) The simulated human body model for injection training of the above (1), wherein the second layer is configured to provide elasticity when the first layer is pressed toward the second layer, by having a plate section, whose middle section is bowed to protrude towards the first layer.

(10) The simulated human body model for injection training of the above (9), wherein the second layer comprises a curvature maintaining means for maintaining the plate section, whose middle section is bowed to protrude towards the first layer, in its bowed state.

(11) The simulated human body model for injection training of the above (10), further comprising a base section for maintaining the second layer standing with its plate section bowed horizontally and its top section extending vertically.

(12) The simulated human body model for injection training of the above (2), wherein each of the second layer and the fourth layer is configured to provide elasticity when the first layer is pressed toward the second layer and the fourth layer, by having a plate section, whose middle section is bowed to protrude towards the first layer.

(13) The simulated human body model for injection training of the above (12), wherein each of the second layer and the fourth layer further comprises a curvature maintaining means for maintaining its respective plate section, whose middle section is bowed to protrude towards the first layer, in its bowed state.

(14) The simulated human body model for injection training of the above (5), wherein the structure is formed by deforming a part of the plate section constituting the second layer, and raising the part toward the first layer.

The above and other configurations, operations, and effects of the present invention are described in the following Detailed Description of the Invention and the accompanying drawings such that those configurations, operations, and effects will be readily appreciated by those skilled in the art.

DETAILED DESCRIPTION OF THE INVENTION

One embodiment of the present invention will be described below in detail with reference to accompanying drawings.

First Embodiment: Basic Configuration

Figure 1:
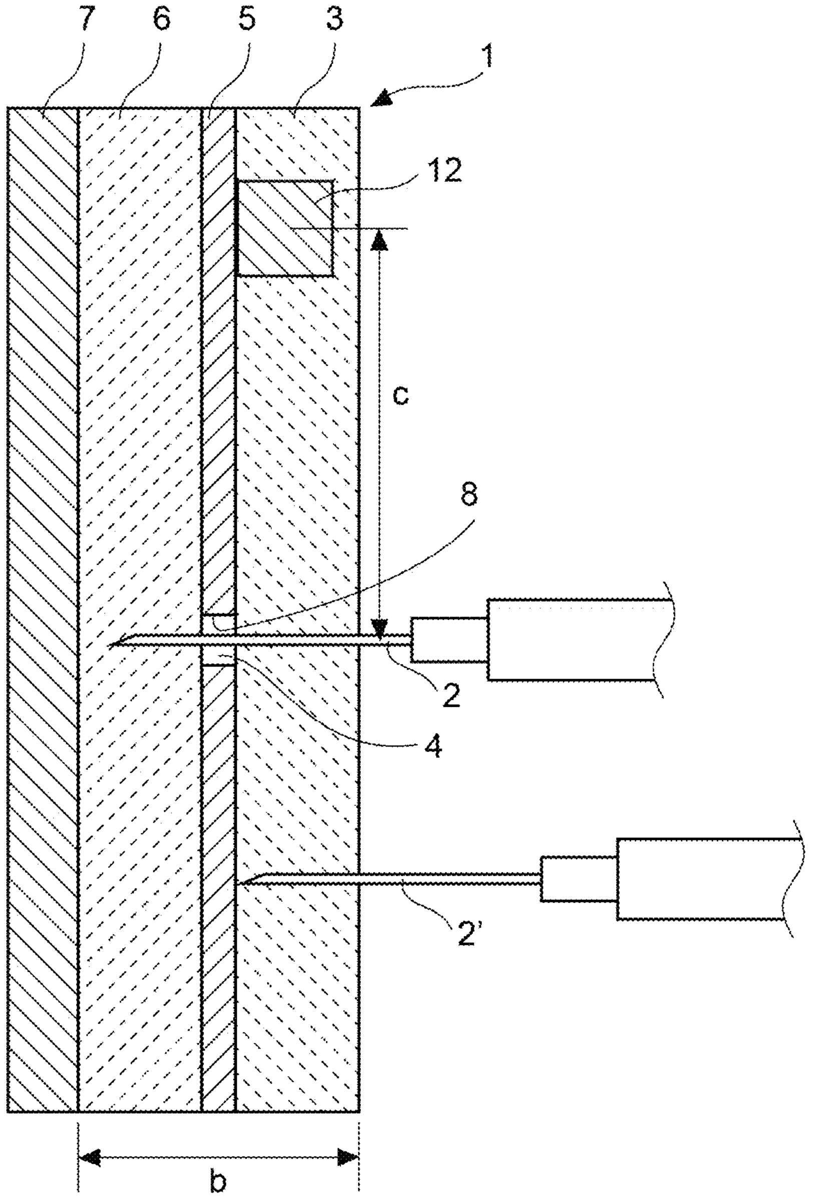
FIG. 1 is a schematic structural view showing one embodiment of the present invention.

FIG. 1 is a cross-sectional view showing a basic configuration of an injection training model of this one embodiment. This injection training model has:

- a layer 3 (corresponding with a first layer as in the Claims) for simulating a surface layer of a human body, into which an injection needle 2 makes a puncture externally;
- a layer 5 (corresponding with a second layer as in the Claims) for causing a trainee to detect that the trainee's puncture location is incorrect, wherein the layer 5 is stacked on the layer 3, which simulates the surface layer, and wherein the layer 5 is formed so that it disallows penetration therethrough by the injection needle (indicated with 2' in the figure) puncturing at any puncture location other than a correct puncture location 4;
- a layer 6 (corresponding with a third layer as in the Claims), stacked on the layer 5, for simulating the subcutaneous tissue and/or muscular layer receiving the injection needle 2 which penetrated the layer 5; and
- a layer 7, stacked on the layer 6, for causing the trainee to detect that the needle puncture is too deep by being formed of a material different from that of the layer 6.

Here, in order to simulate the epidermis, dermis, and subcutaneous tissue, the layer 3 is formed of silicone rubber, or urethane, or hydrogel, or porcine dermal tissue.

Also, the layer 5 is a plate in which a target through hole 8 is formed at the correct puncture location 4, and in order to have a strength against (in order not to allow the pass-through of) the injection needle (indicated with 2' in the figure) puncturing at a location other than the correct puncture location, a polypropylene plate having a thickness of, for example, 0.2 mm-1 mm is formed. Further, the through hole 8 preferably has an elliptical cross-section whose major axis is along the length of an arm, and desirably, the major axis length is 15-30 mm (preferably 25 mm) and the minor axis length is 5-20 mm (preferably 10 mm).

The layer 6 simulates a subcutaneous tissue section and/or a muscular layer. The material simulating the subcutaneous tissue is preferably formed of silicone rubber, or urethane, or hydrogel, or porcine dermal tissue. Also, the material simulating the muscular layer is preferably formed of silicone rubber, or urethane, or hydrogel, or porcine dermal tissue, respectively with a higher puncture resistivity and/or a friction coefficient than those of the subcutaneous tissue simulating material.

Figure 2:
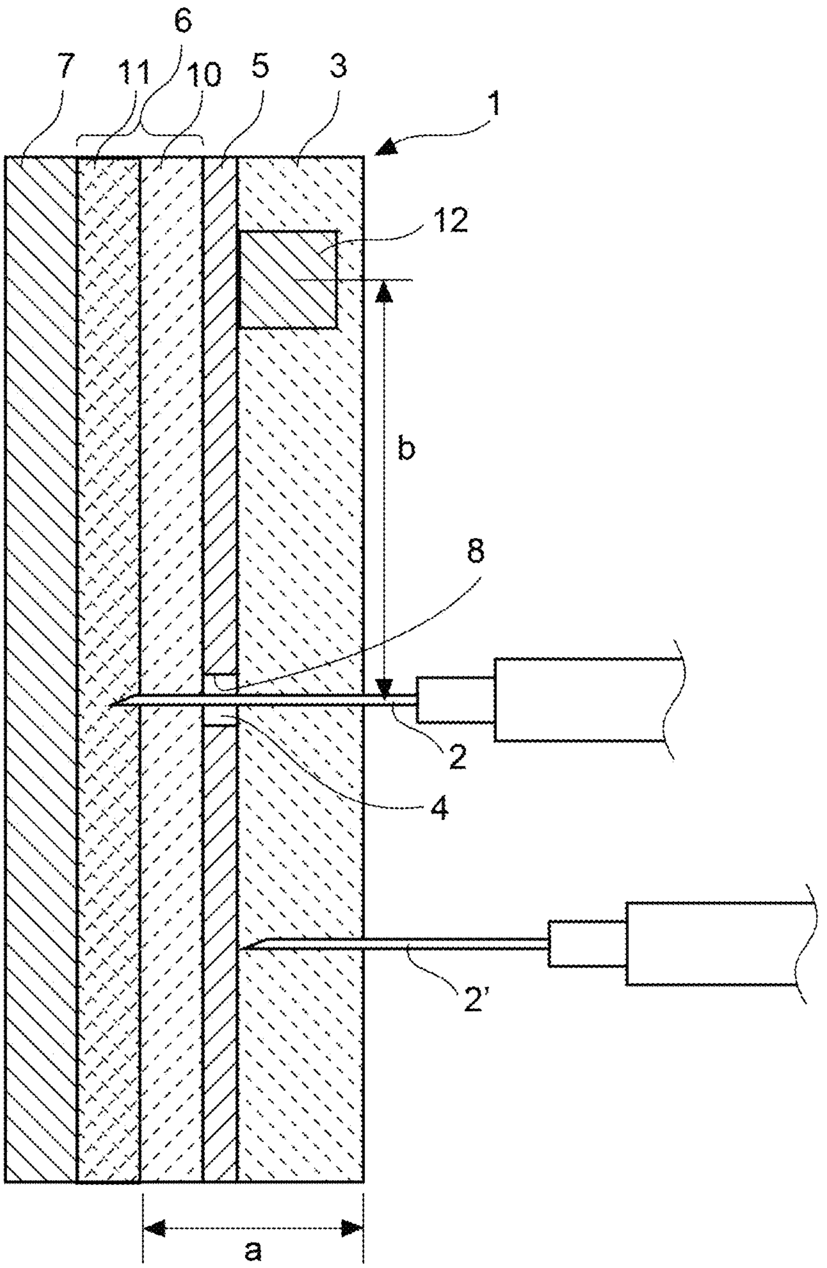
FIG. 2 is another schematic structural view showing the one embodiment of the present invention.

This layer 6 may simulate only the subcutaneous tissue or only the muscular layer, or may simulate a structure defined by the subcutaneous tissue and the muscular layer stacked together. In the latter case, as shown in FIG. 2, the layer 6 is structured by a layer 10 simulating the subcutaneous tissue and a layer 11 simulating the muscular layer stacked together. In this case, the distance from the surface of the layer 3 to the layer 11 (indicated by "a" in FIG. 2) is set according to a type (BMI) of a simulated human body and, for example, when an obese individual is simulated, the distance is set to a greater value than that for a non-obese individual.

Additionally, the layer 7 may be constructed of a material for providing resistance against the puncture of the injection needle 2, for example, a polypropylene plate similarly to the layer 5. Note that the distance from the surface of the layer 3 to this layer 7 (indicated by "b" FIG. 1) is set to a distance desirable to indicate that the needle puncture is too deep, in this case, 2.5 cm-3 cm.

Also, indicated with 12 in the figure is a structure, provided in the layer 3, as a reference with which the trainee determines the correct puncture location.

For example, when an intramuscular injection of a novel coronavirus (COVID-19) vaccine is administered, the correct needle puncture location is the central part of deltoid, and this location is approximately three fingerbreadths below the acromion. If the inoculation site is too high, there is a risk of vaccine-related shoulder joint disorder, and if too low, there is a risk of radial nervous disorder, and therefore, caution must be taken in the puncture location.

The structure 12, taking this COVID-19 vaccine case as an example, provides the location of acromion, and it is positioned at a distance of approximately three fingerbreadths above the correct puncture location (indicated by "c" in the figure). Since this structure 12 needs to be detectable by the trainee palpating the layer 3 from its exterior side, the structure 12 is preferably formed of a material which is harder than the layer 3, or whose elastic modulus is lower than that of the layer 3.

Also, this structure, when viewed from outside, may have a shape simulating a human acromion, and may be formed integrally with the layer 3.

For example, the materials of the layers 3, 5, 6, 7, 10 and 11 are not limited to the ones described above. Particularly, as for the layer 5, it is important that it is "formed so that it disallows penetration therethrough by the injection needle puncturing at any puncture location other than the correct puncture location," and any material satisfying the requirement may be used. Here, "it disallows penetration" means, when a typical puncture technique is performed with a typical puncture force of a practitioner, it has enough rigidity to disallow penetration.

Also, in this one embodiment, each of the above layers had a uniform thickness and a flat shape, each may have a non-uniform thickness and a curved shape.

Further, in this embodiment, the through hole 8 was provided at the correct puncture location in the layer 5, but instead of being a hole, this through hole 8 may be a site formed of a material provided with a different hardness than that of other parts and penetrable by the injection needle. Moreover, the through hole 8 of the above embodiment was elliptical shape, but it may take other shapes, for example, circular, square, or rhombic shape.

Another Embodiment: Specific Example

Now, a second embodiment of the present invention will be described, as a specific embodiment example of the above first embodiment as a basic configuration, with reference to FIG. 3 and FIG. 4. Note that components corresponding with those in the first embodiment have the same reference numbers, respectively, with added "'" to clarify their corresponding relationship.

Figure 3:
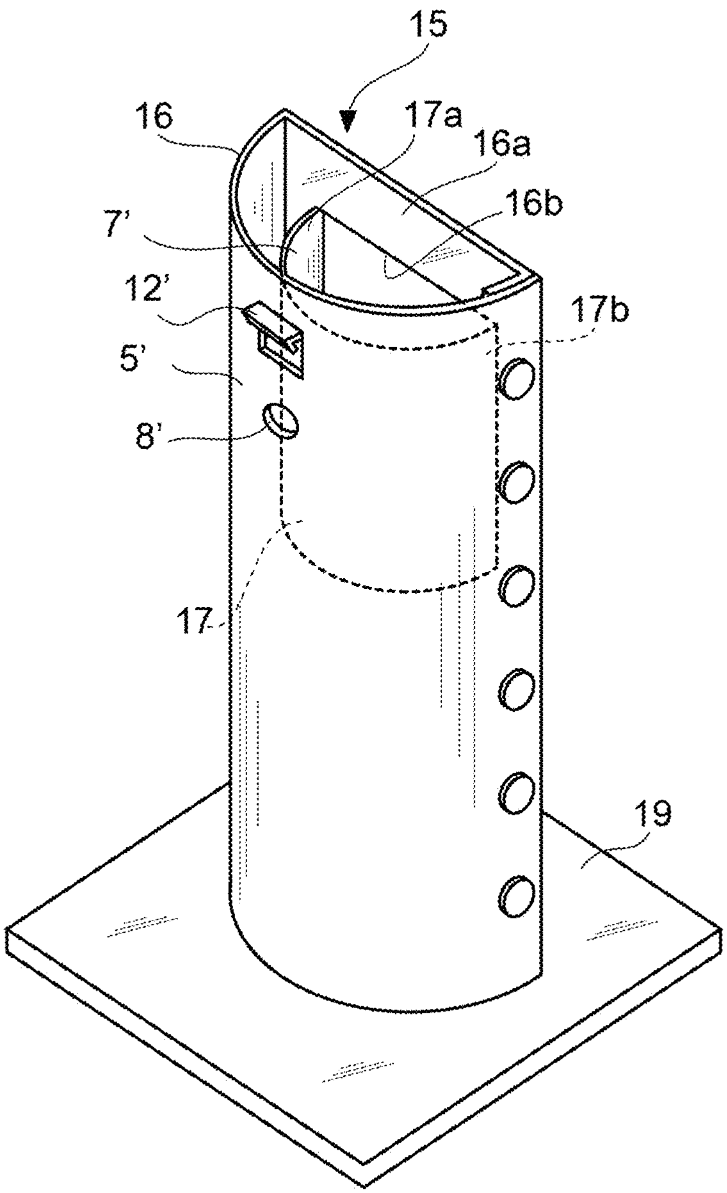
FIG. 3 is a schematic structural view showing a second embodiment of the present invention.

A configuration shown in FIG. 3 implements a configuration corresponding with the layer 5 and the layer 7 of the first embodiment as a skeletal structure 15 of a dual Kamaboko-like (hemi-cylindrical) shape, wherein the skeletal structure 15 is formed by bowing (curving) the middle section of a polypropylene plate member in its width direction, and bending the both end sections to form a back plate (a curvature maintaining means). Then, to this skeletal structure 15, as shown in FIG. 4, materials constituting the layer 3 and the layer 6 of the first embodiment, respectively, are affixed as needed to thereby configure a simulated human body model for injection training, consisting of layers 3', 5', 6', and 7' similarly to the first embodiment.

Here, the skeletal structure 15, as shown in FIG. 3, consists of a hemi-cylindrical first skeletal structure 16 constituting the exterior of the skeletal structure 15, and a similarly hemi-cylindrical second skeletal structure 17 inserted in the first skeletal structure 16. Curved parts of the first and second skeletal structures 16 and 17 constitute a layer 5' and a layer 7', respectively. Also, in order to secure a gap into which a muscular layer 6' is inserted between the parts constituting these layers 5' and 7', both ends 17*a* and 17*b* of the second skeletal structure 17 are secured to a back plate 16*a* connecting the both ends of the first skeletal structure 16. In this example, a hole section 16*b* is provided in the back plate 16*a*, and the both ends 17*a* and 17*b* of the second skeletal structure 17 are inserted into this hole section 16*b*, folded on the other side of the back plate 16*a*, and secured onto this other side of the back plate 16*a*.

Additionally, as shown in FIG. 3, in this second embodiment, a structure corresponding with the structure 12 of the first embodiment, as indicated by 12' in this figure, is constructed by making a cut in an upper end part of the curved part of the first skeletal structure 16, and raising the cut part to make it stand outwardly. Further, a structure corresponding with the through hole 8 of the first embodiment, as discussed above with respect to the first structure 16, is formed and provided as a vertically elongated elliptical through hole 8'.

Figure 4:
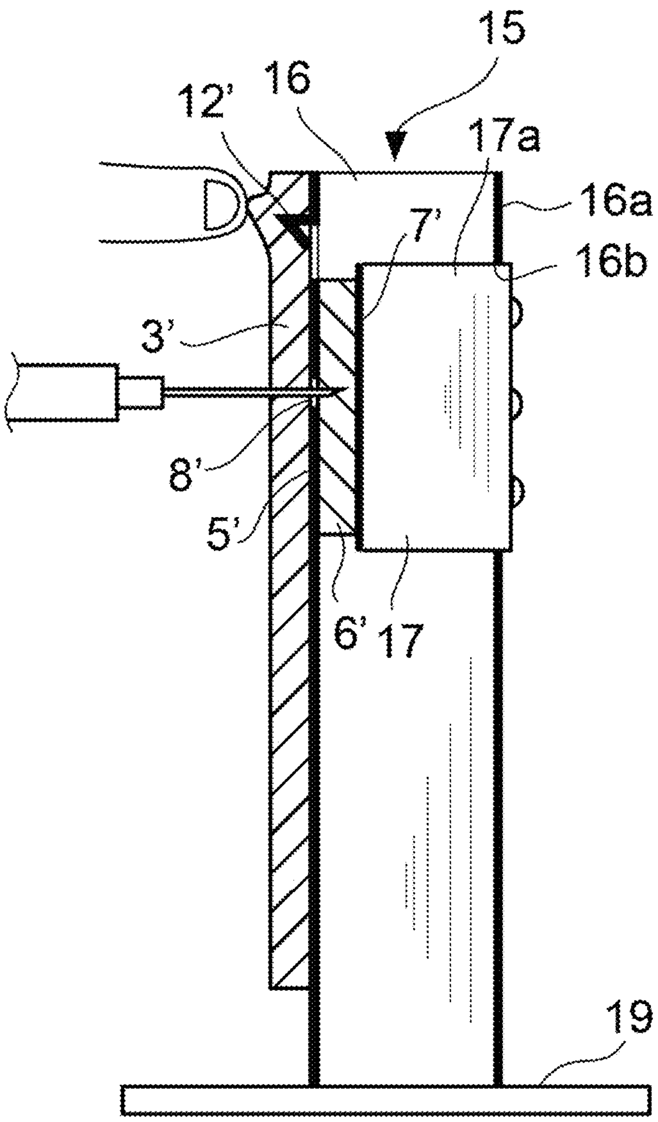
FIG. 4 is another schematic structural view showing the second embodiment of the present invention.

In addition, in this second embodiment, as shown in FIG. 4, the second skeletal structure 17 and the layer 6' are provided only in the range corresponding with the through hole 8'. Moreover, a base section 19 is provided for maintaining the skeletal structure 16 standingly disposed.

According to such a configuration, since each of the layer 5' and the layer 7' is curved in its mid section to protrude towards the first layer, when the layer 3' is pushed in by a finger, for example, the layer 5' and the layer 7' may provide elasticity so that they will bias in the push-back direction, enabling more realistic training.

Note that the layer 3' and the layer 5' do not need to be glued to the first and second skeletal structures 16 and 17, but only need to be detachably attached with their respective upper end sections simply secured to the skeletal structures 16 and 17 by clips or the like. Thus, after a needle puncture training is finished, the next user training may be conducted only by changing the layer 3' and the layer 6' with the skeletal structures 16 and 17 remaining "as is."

Further, needless to say, the present invention is not limited by the above first and second embodiments, and that various changes and modifications can be made without departing from the scope and spirit of the present invention.

For example, the above embodiment was directed to training of intramuscular injection, but it may be directed to other types of injection, or puncture training of other medical instruments.

DESCRIPTION OF THE REFERENCE NUMBERS

1. Simulated human body model
2. Injection needle
3. First layer

4. Correct puncture location
5. Second layer
6. Third layer
7. Fourth layer
8. Hole section
10. Layer simulating subcutaneous tissue
11. Layer simulating muscular layer
12. Structure
15. Skeletal structure
16. First skeletal structure
16*a*. Back plate
16*b*. Hole section
17. Second skeletal structure
17*a*, 17*b*. Both ends
100. Base section

The invention claimed is:

1. A simulated human body model for injection training, comprising:

a first layer for simulating a surface layer of a human body, into which an injection needle makes a puncture externally;

a second layer, stacked on the first layer, and formed so that it disallows penetration therethrough by the injection needle puncturing at any puncture location other than a correct puncture location, for causing a trainee to detect an incorrect puncture location; and a third layer, stacked on the second layer, for simulating subcutaneous tissue receiving the injection needle which penetrated the second layer, and wherein the second layer is configured to provide elasticity when the first layer is pressed toward the second layer, by having a plate section, whose middle section is bowed to protrude towards the first layer.

2. The simulated human body model for injection training of claim 1, further comprising a fourth layer, stacked on the third layer, for causing the trainee to detect a puncture depth of the injection needle by being formed of a material different from that of the third layer.

3. The simulated human body model for injection training of claim 2, wherein each of the second layer and the fourth layer is configured to provide elasticity when the first layer is pressed toward the second layer and the fourth layer, by having a plate section, whose middle section is bowed to protrude towards the first layer.

4. The simulated human body model for injection training of claim 3, wherein each of the second layer and the fourth layer further comprises a curvature maintaining means for maintaining its respective plate section, whose middle section is bowed to protrude towards the first layer, in its bowed state.

5. The simulated human body model for injection training of claim 1, wherein the third layer contains a material simulating a muscular layer.

6. The simulated human body model for injection training of claim 5, wherein the third layer comprises a layer located on the second layer side for simulating the subcutaneous tissue, and a layer stacked thereon for simulating the muscular layer.

7. The simulated human body model for injection training of claim 1, wherein a structure is provided on the first layer as a reference with which the trainee determines the correct puncture location.

8. The simulated human body model for injection training of claim 7, wherein the structure is formed by deforming a part of a plate section constituting the second layer, and raising the part toward the first layer.

9. The simulated human body model for injection training of claim 1, wherein a through hole is provided in the second layer for allowing penetration therethrough by the injection needle at the correct puncture location.

10. The simulated human body model for injection training of claim 9, wherein the through hole comprises an elliptical cross-section having a major axis in a muscular direction.

11. The simulated human body model for injection training of claim 9, wherein the through hole has a major axis length of 15-30 mm and a minor axis length of 5-20 mm.

12. The simulated human body model for injection training of claim 1, wherein the second layer comprises a curvature maintaining means for maintaining the plate section, whose middle section is bowed to protrude towards the first layer, in its bowed state.

13. The simulated human body model for injection training of claim 12, further comprising a base section for maintaining the second layer standing with its plate section bowed horizontally and its top section extending vertically.

* * * * *